United States Patent
Saiwai et al.

(10) Patent No.: US 10,194,281 B2
(45) Date of Patent: Jan. 29, 2019

(54) MBMS CONTROL METHOD, USER TERMINAL, AND BASE STATION

(71) Applicant: KYOCERA CORPORATION, Kyoto (JP)

(72) Inventors: Takahiro Saiwai, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 69 days.

(21) Appl. No.: 15/119,198

(22) PCT Filed: Feb. 20, 2015

(86) PCT No.: PCT/JP2015/054700
§ 371 (c)(1),
(2) Date: Aug. 16, 2016

(87) PCT Pub. No.: WO2015/125901
PCT Pub. Date: Aug. 27, 2015

(65) Prior Publication Data
US 2017/0013422 A1    Jan. 12, 2017

(30) Foreign Application Priority Data
Feb. 21, 2014 (JP) .................................. 2014-032295

(51) Int. Cl.
*H04W 4/06* (2009.01)
*H04L 12/18* (2006.01)
*H04W 74/08* (2009.01)

(52) U.S. Cl.
CPC ............. *H04W 4/06* (2013.01); *H04L 12/189* (2013.01); *H04W 74/0833* (2013.01)

(58) Field of Classification Search
CPC .... H04W 4/06; H04W 74/0833; H04L 12/189
See application file for complete search history.

(56) References Cited

U.S. PATENT DOCUMENTS

| 2004/0146019 A1* | 7/2004 | Kim | ..................... H04W 74/002 |
| | | | 370/329 |
| 2009/0316631 A1* | 12/2009 | Kato | ..................... H04L 5/0016 |
| | | | 370/328 |

(Continued)

FOREIGN PATENT DOCUMENTS

| WO | 2012/109072 A1 | 8/2012 |
| WO | 2013/103754 A1 | 7/2013 |

OTHER PUBLICATIONS

The extended European search report issued by the European Patent Office dated Sep. 25, 2017, which corresponds to EP15751565.1-1870 and is related to U.S. Appl. No. 15/119,198.

(Continued)

*Primary Examiner* — Shailendra Kumar
(74) *Attorney, Agent, or Firm* — Studebaker & Brackett PC

(57) ABSTRACT

An MBMS control method comprises the steps of: transmitting, by a eNB 200 included in the network, an MBMS counting request for counting UE 100s that either receive or have an interest in receiving the MBMS service, by using a predetermined signal that can be received by a user terminal in an RRC idle state; receiving, by an MBMS-compliant UE 100 that supports MBMS reception, the MBMS counting request transmitted by using the predetermined signal, in the RRC idle state; and performing, by the MBMS-compliant UE 100, a predetermined operation for transmitting an MBMS counting response, on the basis of the received MBMS counting request.

6 Claims, 14 Drawing Sheets

(56) References Cited

U.S. PATENT DOCUMENTS

| | | | | |
|---|---|---|---|---|
| 2012/0202493 A1* | 8/2012 | Wang | .................... | H04W 60/00 |
| | | | | 455/435.1 |
| 2013/0107773 A1* | 5/2013 | Chang | .................... | H04W 4/06 |
| | | | | 370/311 |
| 2013/0294320 A1* | 11/2013 | Jactat | .................... | H04L 12/189 |
| | | | | 370/312 |
| 2016/0044634 A1* | 2/2016 | Seo | .................... | H04W 72/005 |
| | | | | 370/312 |

OTHER PUBLICATIONS

International Search Report issued in PCT/JP2015/054700; dated May 19, 2015.
Written Opinion issued in PCT/JP2015/054700; dated May 19, 2015.
Philips et al.; Use of RACH for e-MBMS Counting; 3GPP TSG-RAN WG2#60bis; Tdoc R2-080307; Jan. 14-18, 2008; pp. 1-2; Sevilla, Spain.
3rd Generation Partnership Project; Technical Specification Group Radio Access Network; Evolved Universal Terrestrial Radio Access (E-UTRA); Radio Resource Control (RRC); Protocol specification; 3GPP TS 36.331; V12.0.0; Dec. 2013; pp. 1-349; Release 12; 3GPP Organizational Partners.

\* cited by examiner

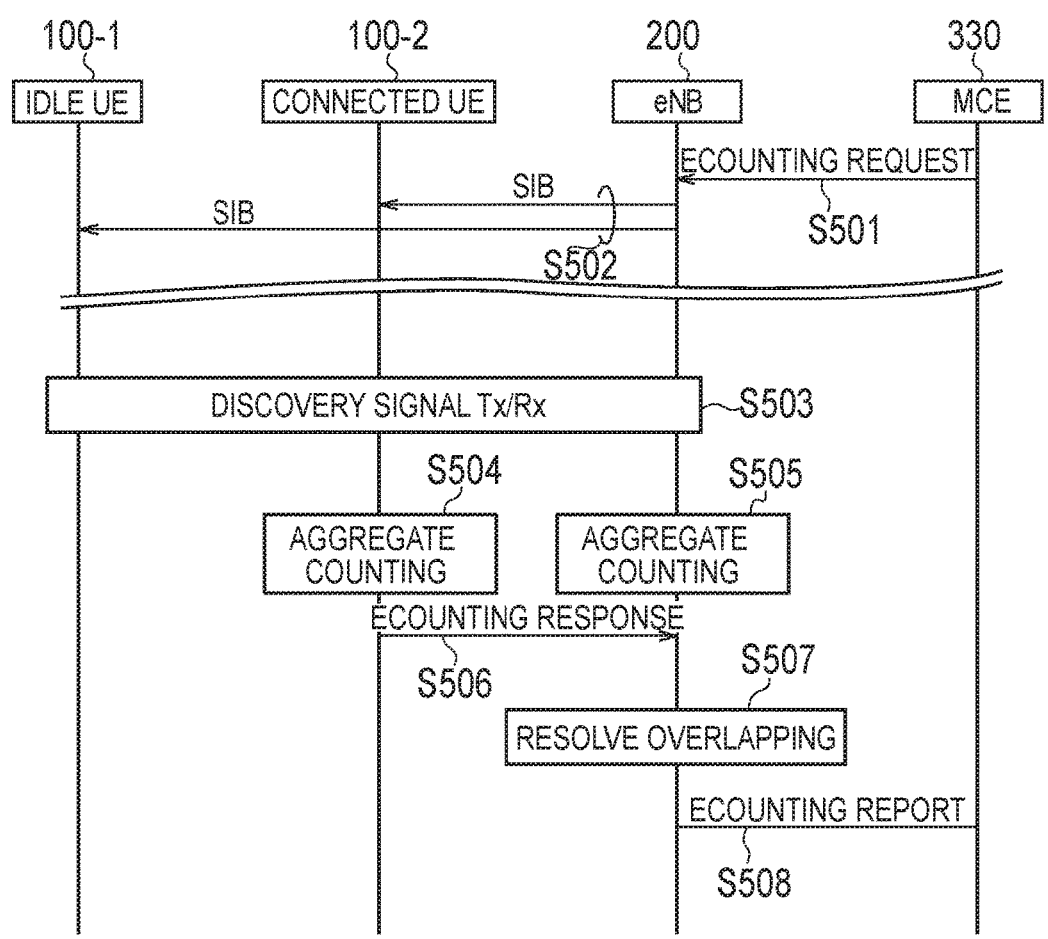

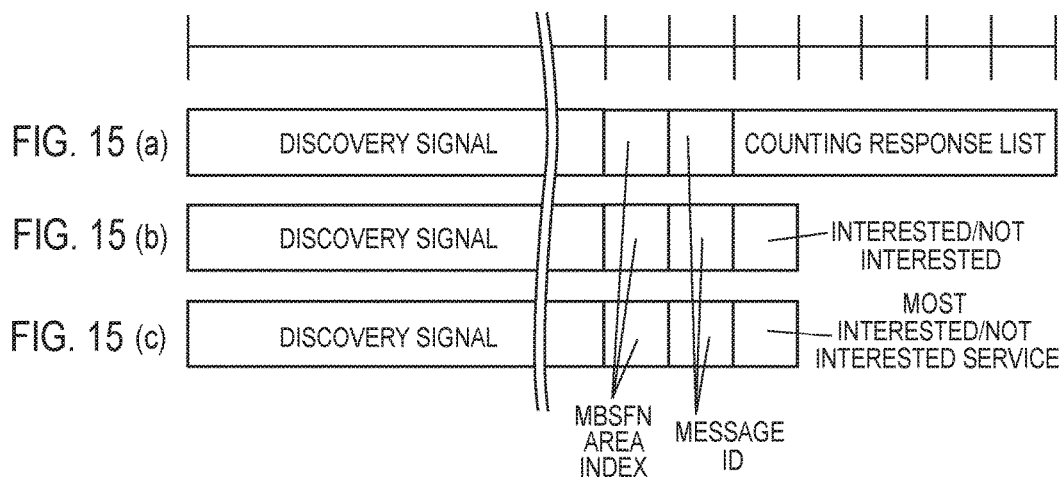
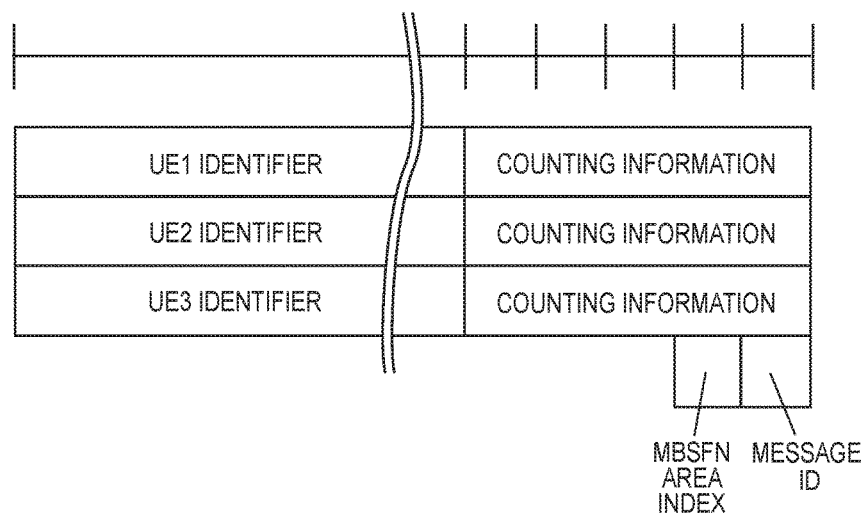

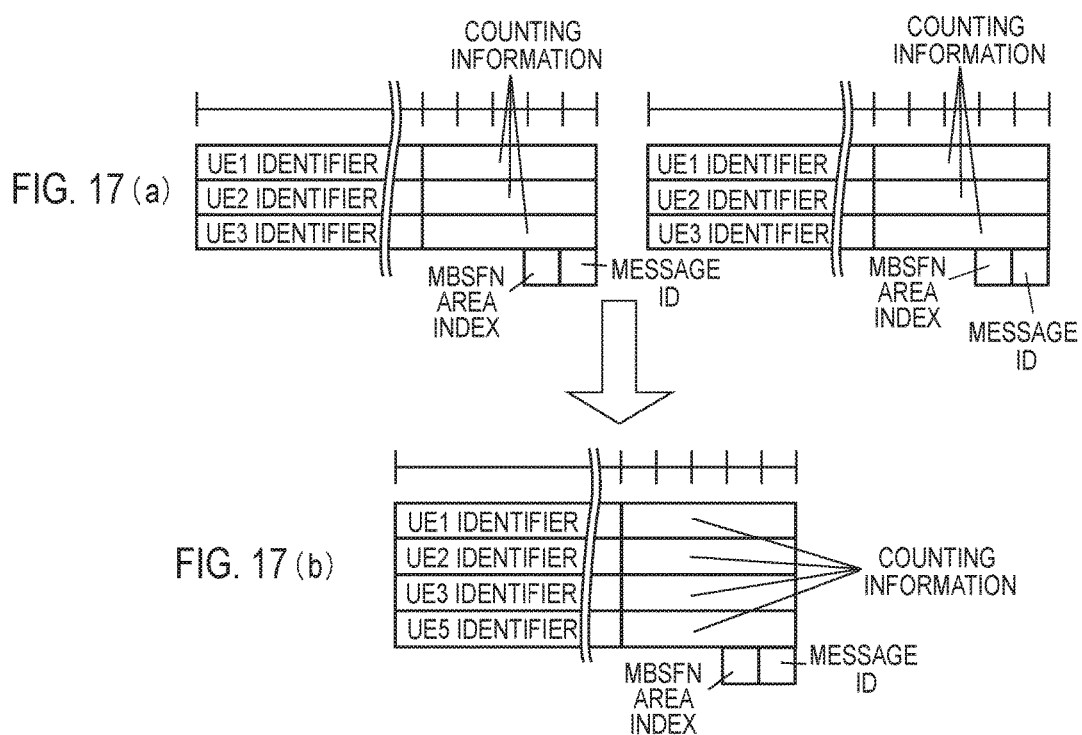

US 10,194,281 B2

MBMS CONTROL METHOD, USER TERMINAL, AND BASE STATION

TECHNICAL FIELD

The present invention relates to an MBMS control method, a user terminal, and a base station used in a mobile communication system.

BACKGROUND ART

In 3GGP (3rd Generation Partnership Project), which is a project aiming to standardize a mobile communication system, the specifications of MBMS (Multimedia Broadcast Multicast Service) have been designed. In the MBMS, a user terminal receives an MBMS service that is provided by multicast or broadcast from a network of a mobile communication system.

Further, in order to enable an understanding of the demand status for an MBMS service in a network, an MBMS counting procedure has been introduced for counting user terminals that either receive or have an interest in receiving the MBMS service (see Non Patent Literature 1).

According to the MBMS counting procedure, the network transmits an MBMS counting request to a user terminal. The user terminal transmits, to the network, an MBMS counting response in an RRC connected state.

CITATION LIST

Non Patent Literature

[NPL 1] 3GPP Technical Specification "TS 36.331 V12.0.0" December, 2013

SUMMARY

An MBMS control method according to a first aspect is a method for understanding a demand status for an MBMS service that is provided from a network of a mobile communication system, by multicast or broadcast, in the network. The MBMS control method comprises the steps of: transmitting, by a base station included in the network, an MBMS counting request for counting user terminals that either receive or have an interest in receiving the MBMS service, by using a predetermined signal that can be received by a user terminal in an RRC idle state; receiving, by an MBMS-compliant terminal that supports MBMS reception, the MBMS counting request transmitted by using the predetermined signal, in the RRC idle state; and performing, by the MBMS-compliant terminal, a predetermined operation for transmitting an MBMS counting response, on the basis of the received MBMS counting request.

A user terminal according to a second aspect supports MBMS reception. The user terminal comprises a receiver configured to receive, from a base station included in a network that provides an MBMS service either by multicast or broadcast, an MBMS counting request for counting the user terminals that either receive or have an interest in receiving the MBMS service; and a controller configured to perform a predetermined operation for transmitting an MBMS counting response on the basis of the received MBMS counting request. The MBMS counting request is transmitted by a predetermined signal that can be received by a user terminal in an RRC idle state. The receiver receives the MBMS counting request transmitted by the predetermined signal, when the user terminal itself is in the RRC idle state.

A base station according to a third aspect supports an MBMS service. The base station comprises a transmitter configured to transmit an MBMS counting request for counting the user terminals that either receive or have an interest in receiving the MBMS service, by a predetermined signal that can be received by a user terminal in an RRC idle state. The MBMS counting request is a request for a user terminal to perform a predetermined operation for transmitting an MBMS counting response.

BRIEF DESCRIPTION OF DRAWINGS

FIG. 14 is a diagram showing an operation sequence according to the fifth embodiment.

FIGS. 15($a$) to 15($c$) are diagrams showing a configuration example of the Discovery signal according to the fifth embodiment.

FIG. 16 is a diagram for describing an operation of an RRC connection UE or an eNB according to the fifth embodiment.

FIGS. 17($a$) and 17($b$) are diagrams for describing a process for resolving an overlapping of an MBMS counting response according to the fifth embodiment.

DESCRIPTION OF EMBODIMENTS

Figure 1:
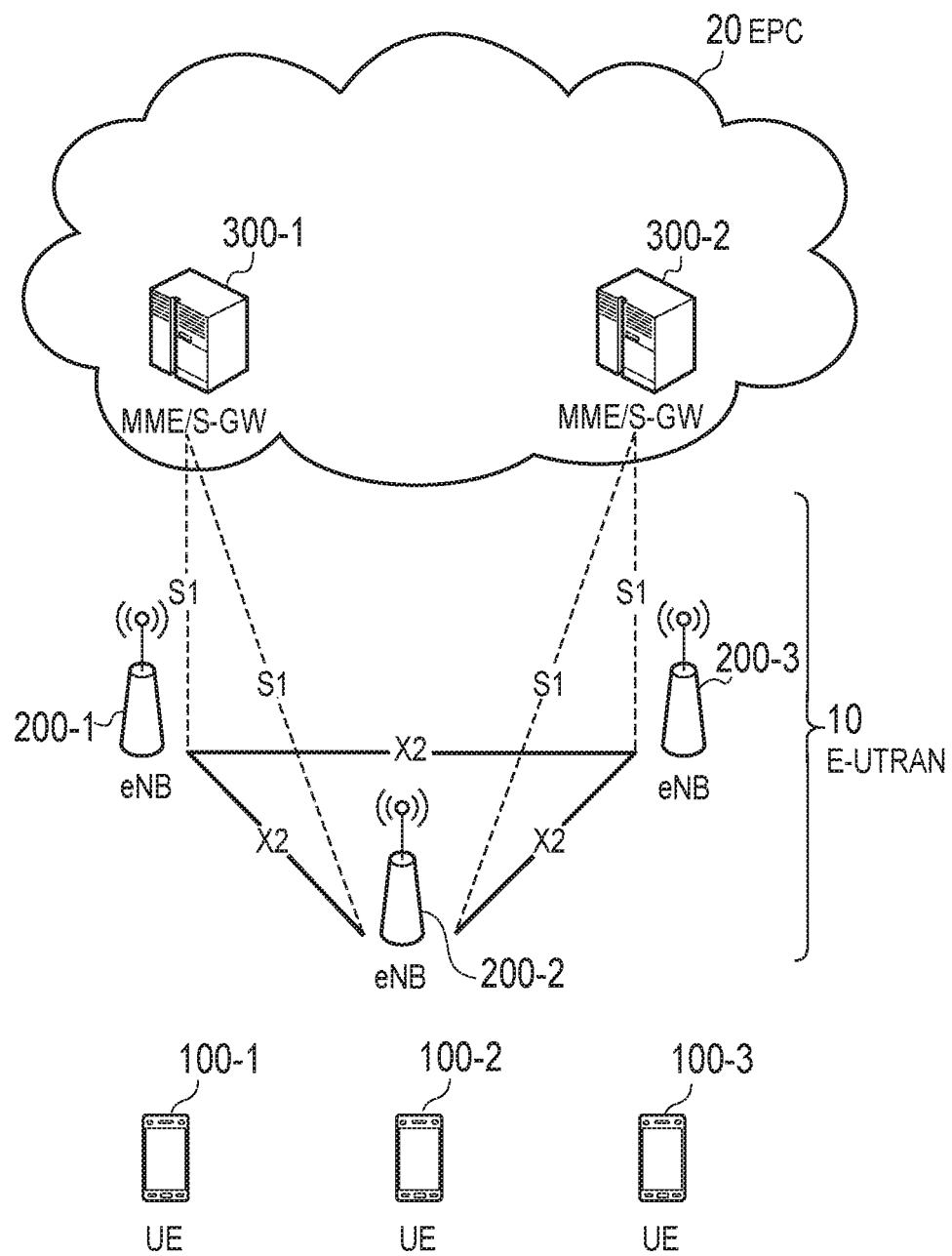
FIG. 1 is a configuration diagram of an LTE system according to a first embodiment to a fifth embodiment.

In MBMS, not only a user terminal that is in an RRC connected state (hereinafter, called an "RRC connection terminal"), but also a user terminal that is in an RRC idle state (hereinafter, called an "RRC idle terminal") can receive an MBMS service.

However, while the above-described MBMS counting procedure is applicable to an RRC connection terminal, it is not applicable to an RRC idle terminal, which results in a problem that the demand status for the MBMS service cannot be sufficiently understood in the network.

Therefore, an object of the present invention is to provide an MBMS control method, a user terminal, and a base station by which it is possible to sufficiently understand a demand status for an MBMS service in a network.

Overview of Embodiments

An MBMS control method according to a first embodiment to a fifth embodiment is a method for understanding a demand status for an MBMS service that is provided from a network of a mobile communication system, by multicast or broadcast, in the network. The MBMS control method comprises the steps of: transmitting, by a base station included in the network, an MBMS counting request for counting user terminals that either receive or have an interest in receiving the MBMS service, by using a predetermined signal that can be received by a user terminal in an RRC idle state; receiving, by an MBMS-compliant terminal that supports MBMS reception, the MBMS counting request transmitted by using the predetermined signal, in the RRC idle state; and performing, by the MBMS-compliant terminal, a predetermined operation for transmitting an MBMS counting response, on the basis of the received MBMS counting request.

In the first embodiment to the fifth embodiment, the predetermined signal is a broadcast signal or a multicast signal.

In the first embodiment to the fifth embodiment, the MBMS control method further comprises a step of requesting, by an MBMS control apparatus included in the network, to the base station, the transmission of the MBMS counting request. In the step of transmitting the MBMS counting request, the base station transmits the MBMS counting request in response to the request from the MBMS control apparatus.

In the first embodiment, the step of performing the predetermined operation comprises a step of holding, by the MBMS-compliant terminal that receives the MBMS counting request, the transmission of the MBMS counting response until the MBMS-compliant terminal transitions to an RRC connected state. The MBMS control method further comprises a step of transmitting, by the MBMS-compliant terminal, the MBMS counting response to the network, after transitioning to the RRC connected state.

In the first embodiment to the fifth embodiment, the MBMS counting request includes information indicating a message effective period of the MBMS counting request, such that when the message effective period expires before transition to the RRC connected state, the MBMS-compliant terminal that receives the MBMS counting request cancels the transmission of the MBMS counting response.

In the first embodiment to the fifth embodiment, the MBMS counting request includes a message identifier of the MBMS counting request. In the step of transmitting the MBMS counting response, the MBMS-compliant terminal transmits the MBMS counting response including the message identifier, to the network.

In the second embodiment and the third embodiment, the step of performing the predetermined operation comprises a step of performing, by the MBMS-compliant terminal that receives the MBMS counting request, a random access procedure for the network, upon satisfying a predetermined condition. The MBMS control method further comprises a step of transmitting, by the MBMS-compliant terminal that has transitioned to the RRC connected state through the random access procedure, to the network, the MBMS counting response.

In the second embodiment, the MBMS counting request includes an MBMS service identifier. The predetermined condition is a condition according to which the MBMS-compliant terminal either receives or has an interest in receiving an MBMS service indicated by the MBMS service identifier.

In an operation pattern 1 of the third embodiment, the predetermined condition is a condition according to which a paging signal addressed to the MBMS-compliant terminal is received separately from the MBMS counting request.

In an operation pattern 2 of the third embodiment, the predetermined signal is a paging signal addressed to the MBMS-compliant terminal. After transitioning to the RRC connected state, the MBMS-compliant terminal that receives the MBMS counting request transmitted by using the paging signal, transmits the MBMS counting response to the network.

In the third embodiment, the MBMS control method further comprises a step of determining, by the base station that transmits the paging signal, a transmission destination of the paging signal on the basis of at least either one of a status of handover of a user terminal to the base station, and a status of availability of a non-contention-based random access preamble secured by the base station.

In the fourth embodiment, the step of performing the predetermined operation comprises a step of performing, by the MBMS-compliant terminal that receives the MBMS counting request, a random access procedure for the network. The MBMS control method further comprises a step of transmitting, by the MBMS-compliant terminal that has transitioned to the RRC connected state through the random access procedure, to the network, an MBMS counting response. The MBMS counting request includes control information for controlling a timing of transmitting a random access preamble in the random access procedure.

In the fourth embodiment, the control information includes a standard time interval and a maximum time interval of transmitting the random access preamble. The step of performing the random access procedure determines a timing of transmitting the random access preamble on the basis of the standard time interval and a random number, within a range in which the maximum time interval is not exceeded.

In the fifth embodiment, the MBMS-compliant terminal further supports D2D communication, which is direct communication between terminals. The step of performing the predetermined operation comprises a step of transmitting, by the MBMS-compliant terminal that receives the MBMS counting request, the MBMS counting response through a D2D signal, in the RRC idle state.

In the fifth embodiment, the MBMS control method further comprises the steps of: receiving, by an RRC connection terminal which is a user terminal in an RRC connected state, the MBMS counting response that is transmitted by using the D2D signal; and transferring, by the RRC connection terminal, to the network, the received MBMS counting response.

In the fifth embodiment, in the step of transferring, the RRC connection terminal transfers the received MBMS counting response, to the network, together with an identifier of the MBMS-compliant terminal.

In the fifth embodiment, the MBMS control method further comprises a step of receiving, by the network, the MBMS counting response that is transmitted by using the D2D signal.

A user terminal according to the first embodiment to the fifth embodiment supports MBMS reception. The user terminal comprises a receiver configured to receive, from a base station included in a network that provides an MBMS service either by multicast or broadcast, an MBMS counting request for counting the user terminals that either receive or have an interest in receiving the MBMS service; and a controller configured to perform a predetermined operation for transmitting an MBMS counting response on the basis of the received MBMS counting request. The MBMS counting request is transmitted by a predetermined signal that can be received by a user terminal in an RRC idle state. The receiver receives the MBMS counting request transmitted by the predetermined signal, when the user terminal itself is in the RRC idle state.

A base station according to the first embodiment to the fifth embodiment supports an MBMS service. The base station comprises a transmitter configured to transmit an MBMS counting request for counting the user terminals that either receive or have an interest in receiving the MBMS service, by a predetermined signal that can be received by a user terminal in an RRC idle state. The MBMS counting request is a request for a user terminal to perform a predetermined operation for transmitting an MBMS counting response.

First Embodiment

An embodiment of applying the present invention to the LTE system will be described below.

(1) System Configuration

A system configuration of a LTE system according to a first embodiment will be described below. FIG. 1 is a configuration diagram of an LTE system according to the first embodiment.

As illustrated in FIG. 1, the LTE system according to the first embodiment includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface. Furthermore, the E-UTRAN 10 and the EPC 20 configure a network of the LTE system.

Figure 2:
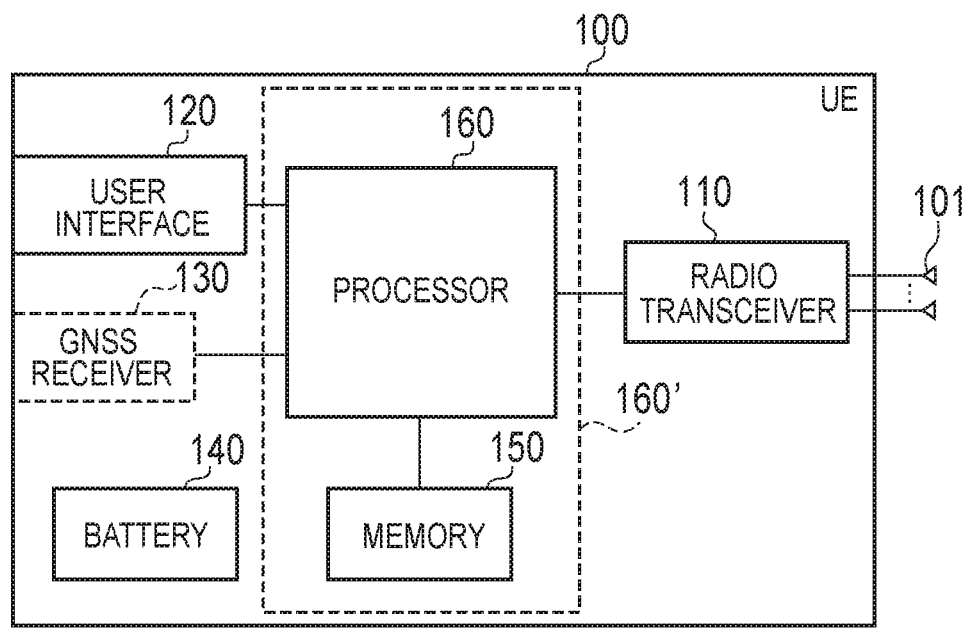
FIG. 2 is a block diagram of a UE according to the first embodiment to the fifth embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (a transmission signal) output from the processor 160 into the radio signal and transmits the radio signal from the antennas 101. Furthermore, the radio transceiver 110 converts a radio signal received by the antennas 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
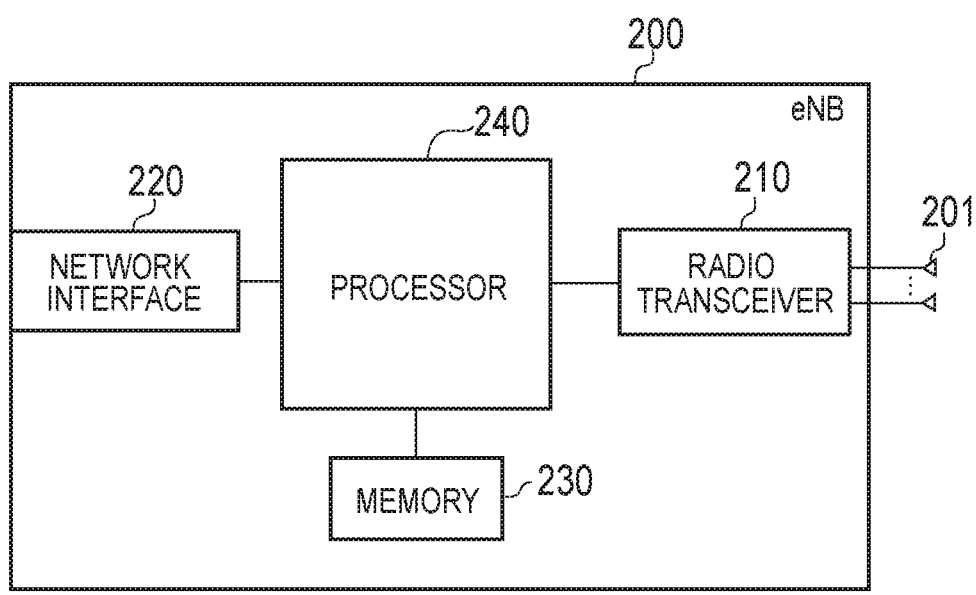
FIG. 3 is a block diagram of an eNB according to the first embodiment to the fifth embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller. Further, the memory 230 may be integrally formed with the processor 240, and this set (that is, a chipset) may be called as a processor.

The antennas 201 and the radio transceiver 210 are used to transmit and receive a radio signal. The radio transceiver 210 converts a baseband signal (a transmission signal) output from the processor 240 into the radio signal and transmits the radio signal from the antennas 201. Furthermore, the radio transceiver 210 converts a radio signal received by the antennas 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
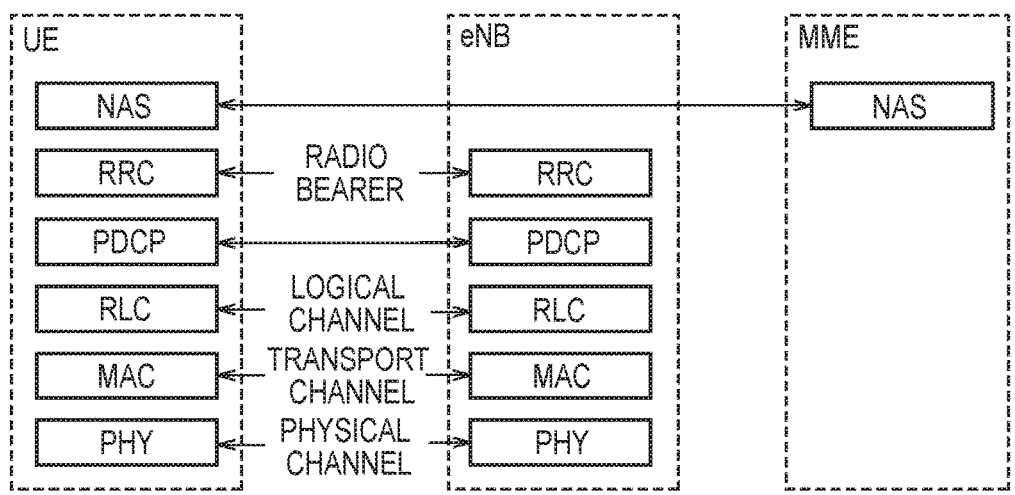
FIG. 4 is a protocol stack diagram of a radio interface according to the first embodiment to the fifth embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), a random access procedure, and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 5:
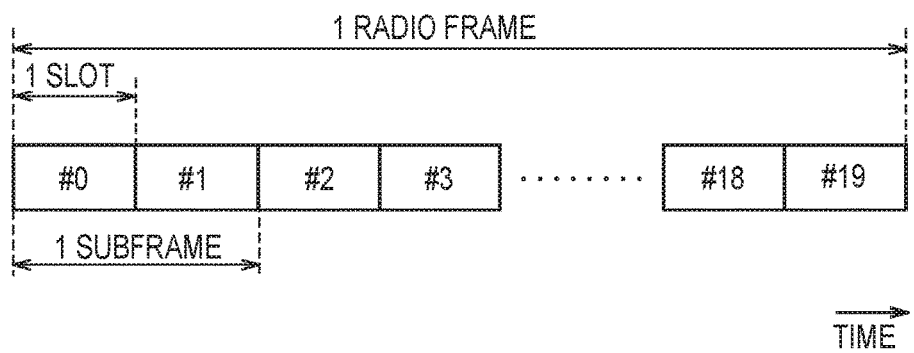
FIG. 5 is a configuration diagram of a radio frame according to the first embodiment to the fifth embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiplex Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources (time-frequency resource) assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

(2) Overview of MBMS

An overview of MBMS will be described below. The LTE system according to the first embodiment supports MBMS (Multimedia Broadcast Multicast Service). In the MBMS, the UE 100 (an MBMS-compliant UE) receives multimedia contents (an MBMS service) distributed by multicast or broadcast from a network. The UE 100 is capable of receiving the MBMS data not only in the RRC connected state but also in the RRC idle state.

Figure 6:
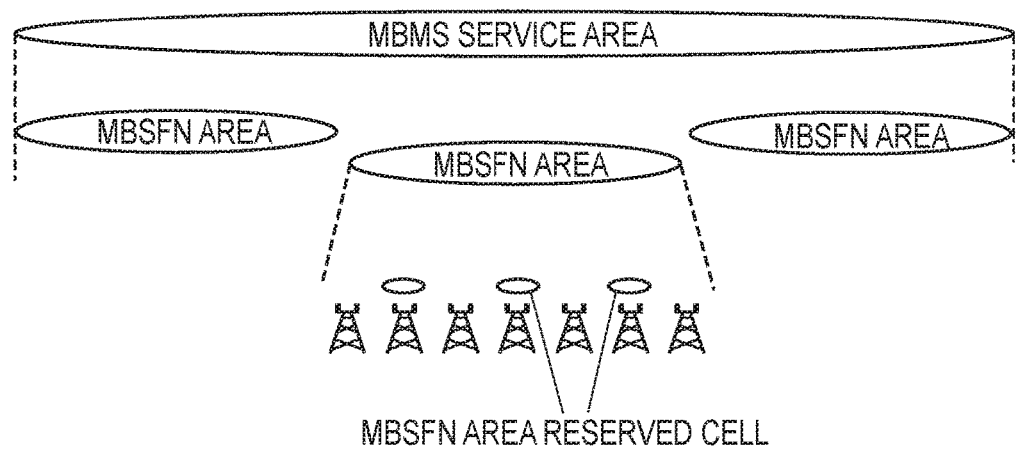
FIG. 6 is a diagram showing an area in which MBMS is provided according to the first embodiment to the fifth embodiment.

FIG. 6 is a diagram showing an area in which MBMS is provided. As shown in FIG. 6, one MBSFN (Multicast-Broadcast Single-Frequency Network) area is configured by a plurality of cells, and an MBMS service area is configured by a plurality of MBSFN areas. One cell may belong to a plurality of MBMS areas.

Figure 7:
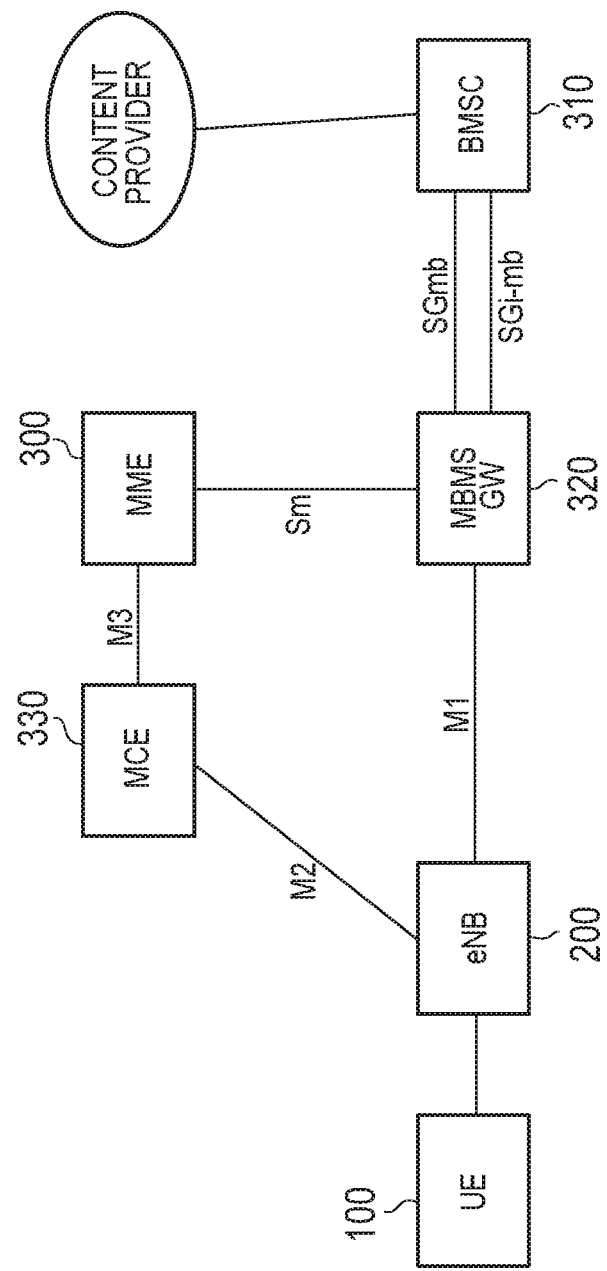
FIG. 7 is a diagram showing a network configuration related to the MBMS according to the first embodiment to the fifth embodiment.

FIG. 7 is a diagram showing a network configuration related to MBMS. As shown in FIG. 7, a BMSC (broadcast multicast service Center) 310 provides a function of distributing MBMS data. An MBMS-GW (MBMS gateway) 320 broadcasts the MBMS data to each eNB 200. An MCE (Multi-cell Coordination Entity) 330 controls a radio resource used by each eNB 200 in the same MBSFN area, or sets an MBSFN subframe. In the first embodiment, the MCE 330 corresponds to an MBMS control apparatus.

Further, in order to enable an understanding of the demand status for the MBMS service in the network, an MBMS counting procedure has been introduced for counting the UEs 100 that either receive or have an interest in receiving the MBMS service (see Non Patent Literature 1).

As described above, according to the MBMS counting procedure, a UE 100 in an RRC connected state (hereinafter, called an "RRC connection UE") transmits, to the network, an MBMS counting response in response to the reception of an MBMS counting request.

According to the current specifications, while the MBMS counting procedure is applicable to an RRC connection UE, it is not applicable to an RRC idle UE, because of which the demand status for the MBMS service cannot be sufficiently understood in the network.

(3) MBMS Control Method According to First Embodiment

An MBMS control method according to the first embodiment will be described below. The MBMS control method according to the first embodiment enables a sufficient understanding of the demand status for the MBMS service in the network.

The MBMS control method according to the first embodiment is a method for understanding the demand status for an MBMS service that is provided from a network by multicast or broadcast, in the network. The MBMS control method comprises the steps of: transmitting, by an eNB 200 included in a network, an MBMS counting request for counting the UEs 100 that either receive or have an interest in receiving the MBMS service, by using a predetermined signal that can be received by an RRC idle UE; receiving, by an MBMS-compliant UE 100 that supports MBMS reception, the MBMS counting request transmitted by using the predetermined signal, in an RRC idle state; and performing, by the MBMS-compliant UE 100, a predetermined operation for transmitting an MBMS counting response in the RRC idle state, on the basis of the received MBMS counting request.

As a result, the MBMS counting procedure is applied not only to an RRC connection UE, but the MBMS counting procedure can also be applied to an RRC idle UE, because of which the demand status for the MBMS service can be sufficiently understood in the network.

In the first embodiment, the predetermined signal is a broadcast signal. Hereinafter, a System Information Block (SIB), which is a type of system information, is illustrated as a broadcast signal. The SIB is a common RRC message that can be received by both an RRC connection terminal and an RRC idle terminal. Alternatively, a multicast signal may be used in place of a broadcast signal.

In the first embodiment, the MCE 330 included in the network requests the transmission of an MBMS counting request to the eNB 200. In response to the request from the MCE 330, the eNB 200 transmits the MBMS counting request.

In the first embodiment, the step of performing the predetermined operation comprises a step of holding, by the MBMS-compliant UE 100 that receives the MBMS counting request, the transmission of the MBMS counting response until the MBMS-compliant UE 100 transitions to the RRC connected state. The MBMS-compliant UE 100 transmits the MBMS counting response to the network after transitioning to the RRC connected state.

That is, in the first embodiment, the MBMS-compliant UE 100 that receives the MBMS counting request does not transition to the RRC connected state with only a purpose of transmitting the MBMS counting response, but transmits the MBMS counting response to the network when transition to the RRC connected state with some other purpose (such as outgoing or incoming call) as the purpose. As a result, an increase in signaling and an increase in process load due to state transition can be suppressed.

In the first embodiment, the MBMS counting request includes information indicating a message effective period of the MBMS counting request. If the message effective period expires before transition to the RRC connected state, then the MBMS-compliant UE 100 that receives the MBMS counting request cancels the transmission of the MBMS counting response.

As a result, for an MBMS-compliant UE 100 that does not transition to the RRC connected state over the span of a long period after receiving the MBMS counting request, the memory capacity of the UE 100 can be saved by discarding the MBMS counting response without transmitting.

In the first embodiment, the MBMS counting request includes a message identifier of the MBMS counting request. In the step of transmitting the MBMS counting response, the MBMS-compliant UE 100 transmits an MBMS counting response including the message identifier, to the network.

As a result, even if the MBMS-compliant UE 100 receives a plurality of MBMS counting requests, it is possible to understand from the message identifier, that the MBMS counting response corresponds to which MBMS counting request, in the network.

(4) Operation Sequence According to First Embodiment

Figure 8:
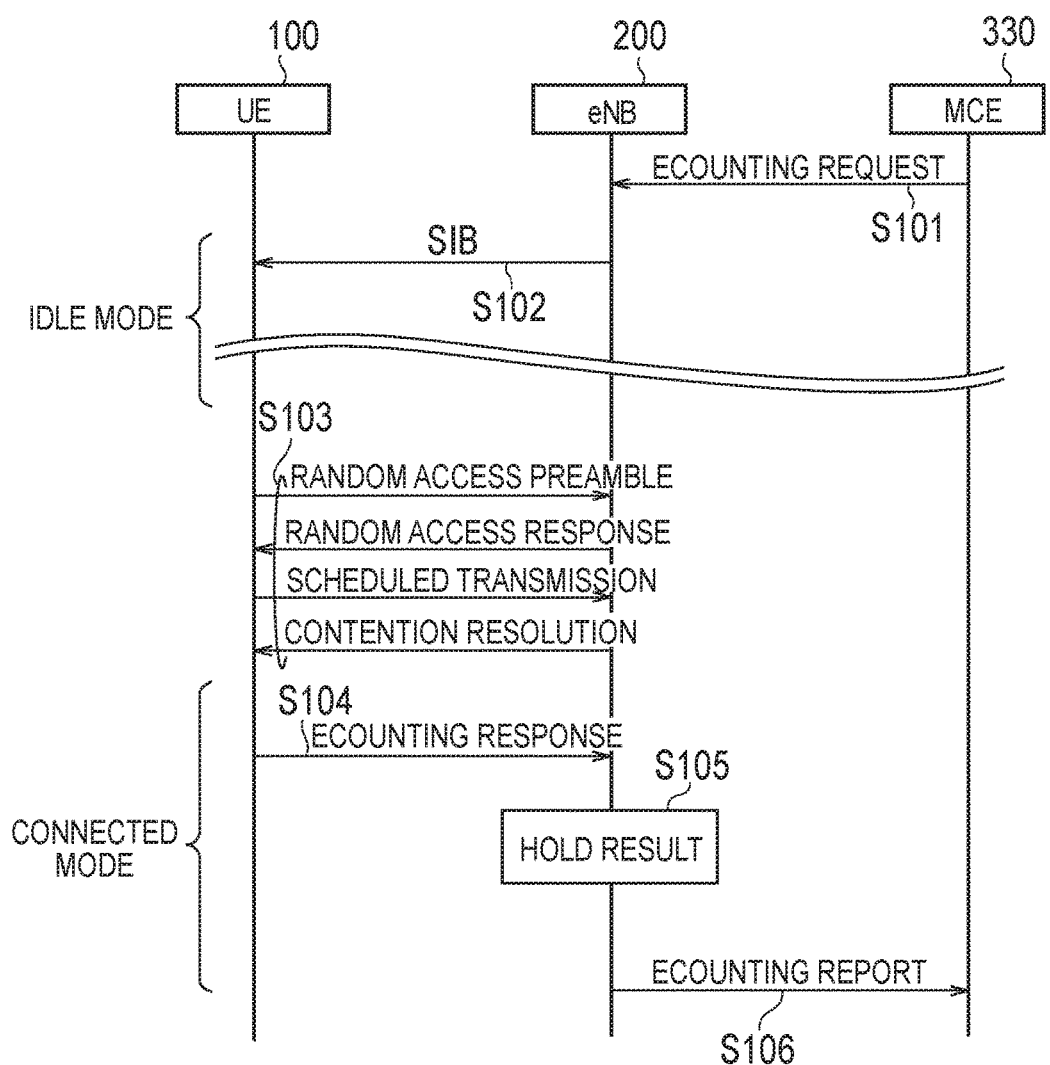
FIG. 8 is a diagram showing an operation sequence according to the first embodiment.

Hereinafter, an operation sequence according to the first embodiment will be described. FIG. 8 is a diagram showing an operation sequence according to the first embodiment. In an initial state shown in FIG. 8, the MBMS-compliant UE 100 is in an RRC idle state (Idle mode).

As shown in FIG. 8, in step S101, the MCE 330 transmits, to the eNB 200, a request for MBMS counting (enhanced Counting Request). The request for MBMS counting includes a Counting Request List, which is a list of IDs (TMGIs: Temporary Mobile Group Identities) of the MBMS services to be counted, a message effective period, and a message identifier (message ID). The message effective period, can be specified in a subframe unit or a radio frame (SFN) unit, for example.

In step S102, the eNB 200 transmits the MBMS counting request (enhanced Counting Request Message) through an SIB in response to a request from the MCE 330. The MBMS counting request includes the above-described Counting Request List, message effective period, and message ID. The MBMS-compliant UE 100 that receives the MBMS counting request starts a timer for timing the message effective period. Further, the eNB 200 that has transmitted the MBMS counting request may start a timer for timing the message effective period.

It is noted that in the RRC idle state, upon moving to a second MBSFN area that is different from a first MBSFN area during the reception of the MBMS counting request, the MBMS-compliant UE 100 that receives the MBMS counting request performs any one of the operations described below.

Discard of setting of the MBMS counting request and the MBMS counting response.

Hold-up of setting of the MBMS counting request and the MBMS counting response without discarding.

hold-up of Setting of the MBMS counting request and the MBMS counting response without discarding only when the first MBSFN area and the second MBFSN area are under the management of the same MCE 330.

In step S103, the MBMS-compliant UE 100 performs a random access procedure for the network in response to an outgoing or an incoming call, for example. Here, the MBMS-compliant UE 100 may perform the random access procedure for an eNB 200 that is different from the eNB 200 that has transmitted the MBMS counting request. FIG. 8 illustrates a contention-based random access procedure. The MBMS-compliant UE 100 transitions to the RRC connected state (Connected mode) by the random access procedure.

In step S104, the MBMS-compliant UE 100 transmits, to the eNB 200, an MBMS counting response (enhanced Counting Response Message) in response to transition to the RRC connected state. The MBMS counting response includes a Counting Response List corresponding to the Counting Request List, an identifier of the MBSFN area (Mbsfn Area Index), and a message ID.

In step S105, the eNB 200 that receives the MBMS counting response retains the received MBMS counting response until the expiry of the message effective period. Alternatively, the eNB 200 that receives the MBMS counting response may transfer the received MBMS counting response to the MCE 330 without taking the message effective period into consideration.

It is noted that upon receiving an MBMS counting response corresponding to the second MBSFN area that is different from the first MBSFN area to which the eNB 200 belongs, the eNB 200 transfers the received MBMS counting response either to another eNB 200 belonging to the second MBSFN area, or to the MCE 330.

In step S106, the eNB 200 aggregates the MBMS counting responses and transmits an MBMS counting report (an enhanced Counting Report) to the MCE 330. The MBMS counting report includes a Counting Response List.

Second Embodiment

A second embodiment will be described while focusing on the differences from the first embodiment. The second embodiment is similar to the first embodiment in regard to the system configuration.

(1) MBMS Control Method According to Second Embodiment

An MBMS control method according to the second embodiment will be described below.

The MBMS control method according to the second embodiment comprises the steps of: performing, by an MBMS-compliant UE 100 that receives an MBMS counting request, a random access procedure for a network, upon satisfying a predetermined condition; and transmitting, by the MBMS-compliant UE 100 that has transitioned to an RRC connected state through the random access procedure, to the network, an MBMS counting response.

That is, in the second embodiment, upon satisfying a predetermined condition, the MBMS-compliant UE 100 (RRC idle UE) that receives the MBMS counting request immediately (forcibly) performs the random access procedure for the network.

Here, the reason for stipulating the condition (predetermined condition) of performing the random access procedure is as described below. Specifically, it is assumed that if all MBMS-compliant UEs 100 (RRC idle UEs) that have received an MBMS counting request perform the contention-based random access procedure all at once, then a conflict of the random access preamble may occur, and a random access failure may occur frequently. Alternatively, it is assumed that if all MBMS-compliant UEs 100 (RRC idle UEs) that have received an MBMS counting request perform a non-contention-based random access procedure all at once, then the non-contention-based random access preamble may not be sufficient. Therefore, it is possible to resolve the above-described problem by stipulating the condition (predetermined condition) of performing the random access procedure.

In the second embodiment, the MBMS counting request includes an MBMS service identifier. Specifically, the MBMS counting request includes a Counting Request list, which is a list of IDs (TMGIs) of the MBMS services to be counted. The predetermined condition is a condition according to which the MBMS service indicated by the MBMS service identifier is either being received, or there is an interest in receiving the MBMS service.

In this way, The MBMS-compliant UE 100 (RRC idle UE) transitions to the RRC connected state only when the MBMS-compliant UE either receives or has an interest in receiving the MBMS service indicated by the MBMS service identifier included in the MBMS counting request, and then transmits an MBMS counting response to the network. Thus, it is possible to appropriately constrict the MBMS-compliant UEs 100 (RRC idle UEs) that perform the random access procedure, and as a result, it is possible to resolve the problem described above.

(2) Operation Sequence According to Second Embodiment

Figure 9:
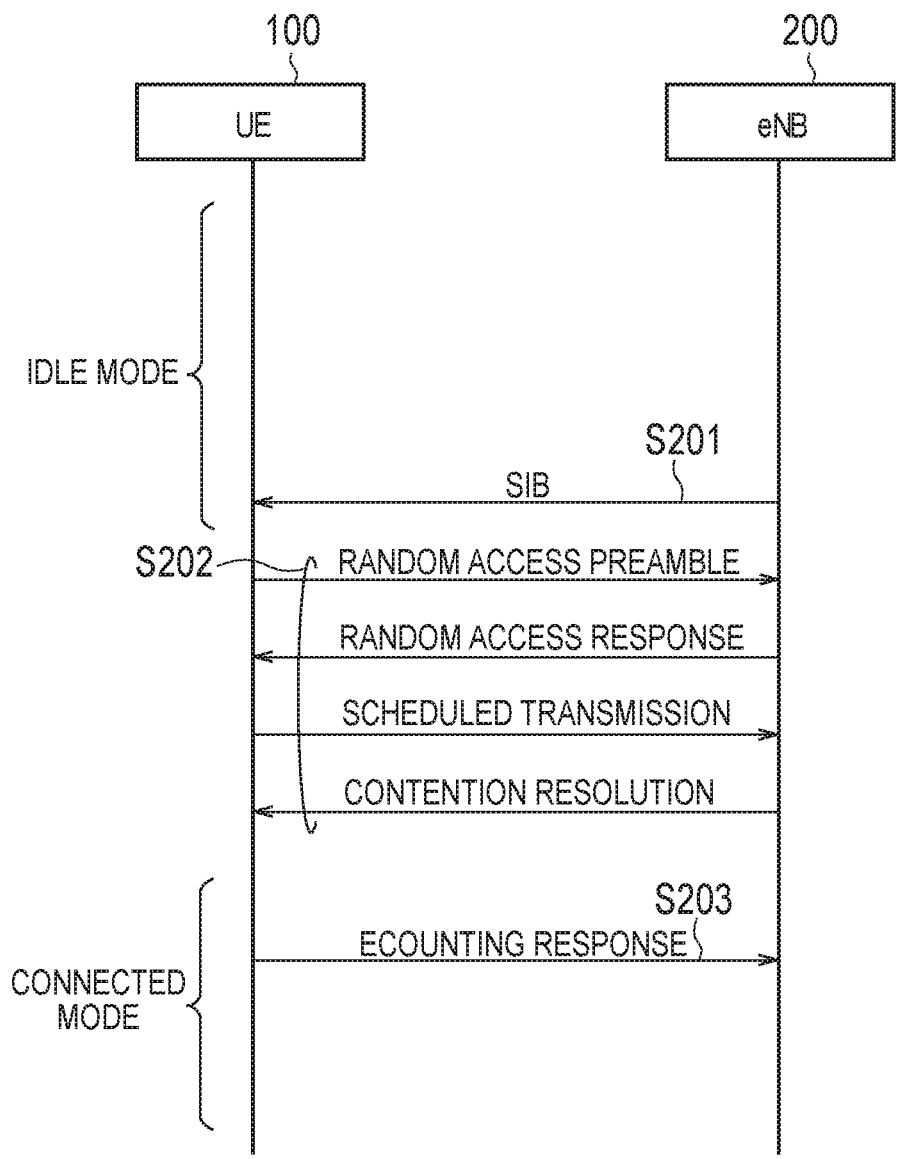
FIG. 9 is a diagram showing an operation sequence according to the second embodiment.

Hereinafter, an operation sequence according to the second embodiment will be described. FIG. 9 is a diagram showing an operation sequence according to the second embodiment. It is noted that the signaling between the eNB 200 and the MCE 330 is similar to that in the first embodiment. Further, in an initial state shown in FIG. 9, the MBMS-compliant UE 100 is in an RRC idle state (Idle mode).

As shown in FIG. 9, in step S201, the eNB 200 transmits an MBMS counting request (enhanced Counting Request Message) through an SIB in response to a request from the MCE 330. The MBMS counting request includes the above-described Counting Request List.

The MBMS-compliant UE 100 that receives the MBMS counting request checks whether or not the MBMS-compliant UE 100 either receives or has an interest in receiving the MBMS service listed in the Counting Request List included in the MBMS counting request. If the MBMS-compliant UE 100 either receives or has an interest in receiving the MBMS service, then it is determined that the MBMS-compliant UE performs the random access procedure for the network.

In step S202, the MBMS-compliant UE 100 performs a random access procedure for the network. FIG. 9 illustrates a contention-based random access procedure. The MBMS-compliant UE 100 transitions to the RRC connected state (Connected mode) by the random access procedure.

In step S203, the MBMS-compliant UE 100 transmits, to the eNB 200, an MBMS counting response (enhanced Counting Response Message) in response to transition to the RRC connected state. The MBMS counting response includes a Counting Response List corresponding to the Counting Request List, and an identifier of the MBSFN area (Mbsfn Area Index).

Third Embodiment

A third embodiment will be described while focusing on the differences from the first embodiment and the second embodiment. The third embodiment is similar to the first embodiment in regard to the system configuration.

(1) MBMS Control Method According to Third Embodiment

An MBMS control method according to the third embodiment will be described below.

The third embodiment is similar to the second embodiment in regard to the point that upon satisfying a predetermined condition, the MBMS-compliant UE 100 that receives the MBMS counting request immediately (forcibly) performs the random access procedure for the network. However, the third embodiment is different from the second embodiment in regard to the point that the third embodiment uses a paging signal and restricts the MBMS-compliant UEs 100 that perform the random access procedure.

In an operation pattern 1 according to the third embodiment, the condition (predetermined condition) of performing the random access procedure is the condition according to which a paging signal addressed to the MBMS-compliant UE 100 is received separately from the MBMS counting request. That is, in the operation pattern 1, the MBMS-compliant UEs 100 that perform the random access procedure are restricted by concurrently using the MBMS counting request and the paging signal through an SIB.

In an operation pattern 2 according to the third embodiment, the predetermined signal that can be received by an RRC idle UE is a paging signal addressed to the MBMS-compliant UE 100. The eNB 200 transmits the MBMS counting request by using the paging signal. The MBMS-compliant UE 100 that receives the MBMS counting request transmitted by using the paging signal, transmits an MBMS counting response to the network after transitioning to the RRC connected state. In this way, in the operation pattern 2, the MBMS-compliant UEs 100 that perform the random access procedure are restricted by transmitting the MBMS counting request by the paging signal rather than transmitting the MBMS counting request by an SIB.

The MBMS control method according to the third embodiment comprises a step of determining, by an eNB 200 that transmits a paging signal, a transmission destination of the paging signal on the basis of at least either one of a status of handover of a UE 100 to the eNB 200 itself, and a status of availability of a non-contention-based random access preamble secured by the eNB 200 itself.

As described above, when a non-contention-based random access procedure is assumed, the non-contention-based random access preamble may become insufficient in a state when the availability of the non-contention-based random access preamble secured by the eNB 200 is less (for example, in a state when the UEs 100 to be handed over to the eNB 200 are large in number). Thus, it is possible to resolve the above-described problem by determining the transmission destination of the paging signal on the basis of at least either one of the status of handover of the UE 100 to the eNB 200 itself, and the status of availability of the non-contention-based random access preamble secured by the eNB 200 itself.

(2) Operation Sequence According to Third Embodiment

Figure 10:
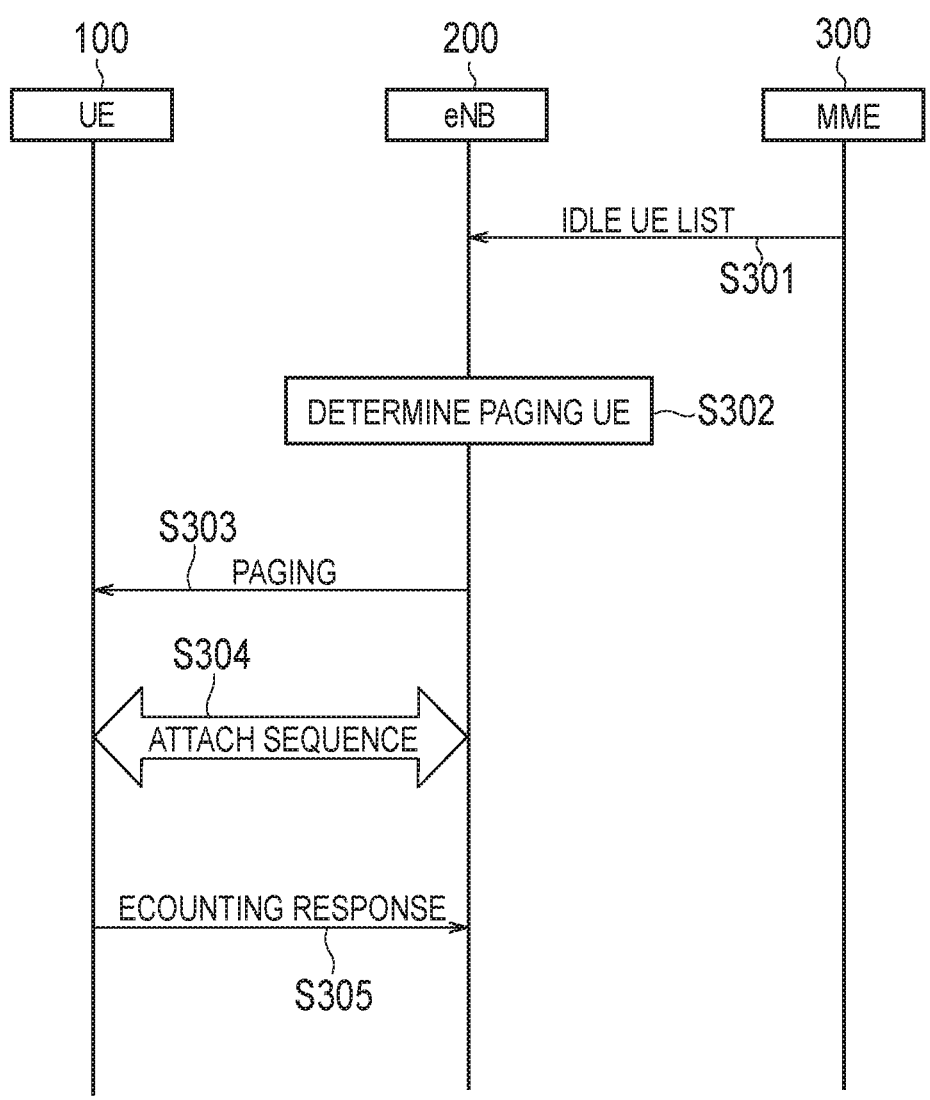
FIG. 10 is a diagram showing an operation sequence according to the third embodiment.

Hereinafter, an operation sequence according to the third embodiment will be described. FIG. 10 is a diagram showing an operation sequence according to the third embodiment. Here, the above-described operation pattern 2 is assumed. It is noted that the signaling between the eNB 200 and the MCE 330 is similar to that in the first embodiment and the second embodiment. Further, in an initial state shown in FIG. 10, the MBMS-compliant UE 100 is in an RRC idle state (Idle mode).

As shown in FIG. 10, in step S301, the MME 300 transmits, to the eNB 200, an idle UE list, which is a list of the RRC idle UEs that exit in a tracking area to which the eNB 200 belongs. It is noted that the MCE 330 may acquire the idle UE list from the MME 300, and transfer the acquired idle UE list to the eNB 200.

In step S302, the eNB 200 that receives the idle UE list determines the transmission-destination UE of the paging signal from the idle UE list, on the basis of at least either one of the status of handover of the UE 100 to the eNB 200 itself (such as the average number of handovers), and the status of availability of a non-contention-based random access preamble secured by the eNB 200 itself. It is noted that when the availability of the non-contention-based random access preamble is less, the paging signal may be controlled to be transmitted based on time division.

In step S303, the eNB 200 transmits an MBMS counting request (enhanced Counting Request Message) by using a paging signal addressed to the determined transmission-destination UE. The MBMS counting request includes the above-described Counting Request List.

In step S304, the MBMS-compliant UE 100 that receives the paging signal (the MBMS counting request) performs an attach procedure including the random access procedure for the network. The MBMS-compliant UE 100 transitions to the RRC connected state (Connected mode) by the random access procedure.

In step S305, the MBMS-compliant UE 100 transmits, to the eNB 200, an MBMS counting response (enhanced Counting Response Message) in response to transition to the RRC connected state. The MBMS counting response includes a Counting Response List corresponding to the Counting Request List, and an identifier of the MBSFN area (Mbsfn Area Index).

It is noted that step S303 through S305 may be changed as follows. Specifically, in step S303, the eNB 200 transmits a normal paging signal to the MBMS-compliant UE 100. In step S304, after establishing an RRC connection, the MBMS-compliant UE 100 skips (does not perform attach) an NAS authentication process, and transmits an MBMS counting request, from the eNB 200, to the MBMS-compliant UE 100. The MBMS-compliant UE 100 that receives the MBMS counting request transmits an MBMS counting response to the eNB 200. The eNB 200 that receives the MBMS counting response releases the RRC connection with the MBMS-compliant UE 100.

Fourth Embodiment

A fourth embodiment will be described while focusing on the differences from the first through third embodiments. The fourth embodiment is similar to the first embodiment in regard to the system configuration.

(1) MBMS Control Method According to Fourth Embodiment

An MBMS control method according to the fourth embodiment will be described below.

The fourth embodiment is similar to the second and third embodiments in regard to the point that the contention of the random access procedure is avoided, but is different from the second and third embodiments in regard to the point that rather than restricting the MBMS-compliant UEs 100 that perform the random access procedure, control is performed so as to shift a timing of performing the random access procedure.

The MBMS control method according to the fourth embodiment comprises the steps of: performing, by an MBMS-compliant UE 100 that receives an MBMS counting request, a random access procedure for a network; and transmitting, by the MBMS-compliant UE 100 that has transitioned to an RRC connected state through the random access procedure, to the network, an MBMS counting response. The MBMS counting request includes the control information for controlling the timing of transmitting the random access preamble in the random access procedure.

In the fourth embodiment, the control information includes a standard time interval (contention window size) and a maximum time interval (maximum contention window size) of transmitting the random access preamble. The MBMS-compliant UE 100 determines the timing of transmitting the random access preamble on the basis of the standard time interval (contention window size) and a random number, within a range in which the maximum time interval (maximum contention window size) is not exceeded.

For example, the MBMS-compliant UE 100 calculates a connection attempt offset by using the calculation formula shown below. The connection attempt offset stipulates the time until the initial transmission timing of the random access preamble, and the time until the retransmission timing based on a random access preamble conflict.

Figure 11:
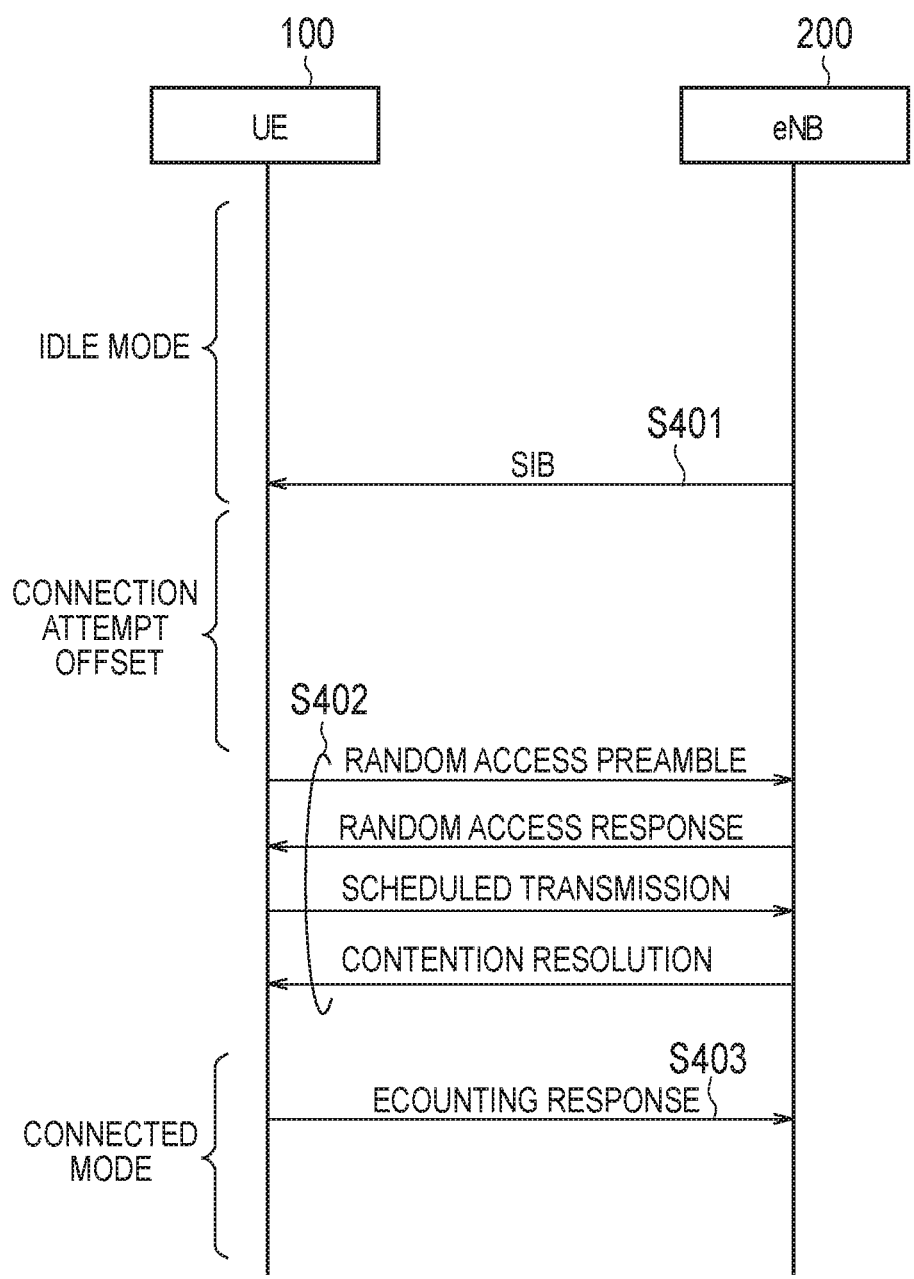
FIG. 11 is a diagram showing an operation sequence according to the fourth embodiment.

Connection attempt offset [ms]=2^Conflict frequency*Contention window size*Uniform random number≤Maximum contention window size (2) Operation Sequence According to Fourth Embodiment Hereinafter, an operation sequence according to the fourth embodiment will be described. FIG. 11 is a diagram showing an operation sequence according to the fourth embodiment. It is noted that the signaling between the eNB 200 and the MCE 330 is similar to that in the first embodiment through the third embodiment. Further, in an initial state shown in FIG. 11, the MBMS-compliant UE 100 is in an RRC idle state (Idle mode).

As shown in FIG. 11, in step S401, the eNB 200 transmits an MBMS counting request (enhanced Counting Request Message) through an SIB in response to a request from the MCE 330. The MBMS counting request includes the above-described Counting Request List and a message ID.

In the fourth embodiment, the MBMS counting request further includes the information described below.

Contention window size (subframe/SFN unit): For calculation of connection attempt offset Maximum contention window size (subframe/SFN unit): Maximum value Maximum conflict frequency [Frequency]: Exceeding this value results in expiry (random access attempt is stopped)

It is noted that the contention window size, the maximum contention window size, and the maximum conflict frequency may be determined on the basis of, for example, the number of UEs 100 that exit in a cell or a tracking area of the eNB 200.

The UE 100 that receives the MBMS counting request calculates the connection attempt offset by using the calculation formula described above, and starts a timer for timing the connection attempt offset.

In step S402, the MBMS-compliant UE 100 performs a random access procedure for the network in response to the expiry of the timer. FIG. 11 illustrates a contention-based random access procedure. The MBMS-compliant UE 100 transitions to the RRC connected state (Connected mode) by the random access procedure.

In step S403, the MBMS-compliant UE 100 transmits, to the eNB 200, an MBMS counting response (enhanced Counting Response Message) in response to transition to the RRC connected state. The MBMS counting response includes a Counting Response List corresponding to the Counting Request List, an identifier of the MBSFN area (Mbsfn Area Index), and a message ID.

Fifth Embodiment

A fifth embodiment will be described while focusing on the differences from the first through fourth embodiments. The fifth embodiment is similar to the first embodiment in regard to the system configuration.

(1) MBMS Control Method According to Fifth Embodiment

Figure 12:
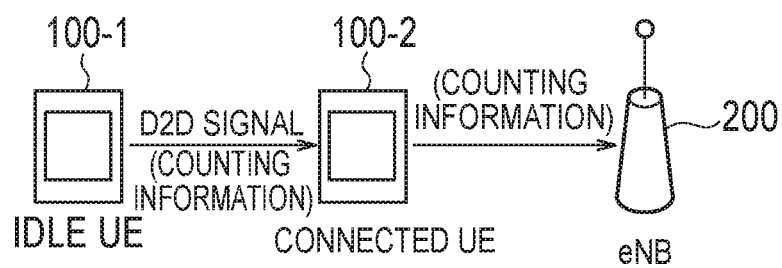
FIGS. 12($a$) and 12($b$) are diagrams showing an MBMS control method according to the fifth embodiment.
Figure 12:
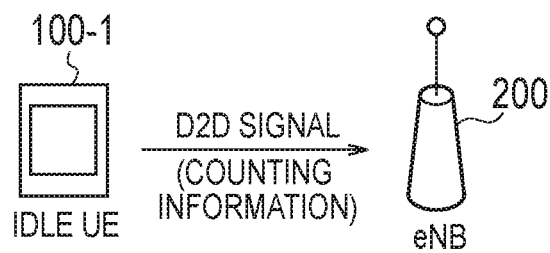

An MBMS control method according to the fifth embodiment will be described below. FIGS. 12(*a*) and 12(*b*) are diagrams showing an MBMS control method according to the fifth embodiment.

In the fifth embodiment, the MBMS-compliant UE 100-1 further supports D2D communication, which is direct communication between UEs. As shown in FIGS. 12(*a*) and 12(*b*), the MBMS control method comprises a step of transmitting, by an MBMS-compliant UE 100-1 that receives an MBMS counting request, an MBMS counting response (Counting information) by using a D2D signal, in an RRC idle state. The D2D signal is a D2D discovery-use signal (Discovery signal) that is used for discovering a neighboring UE. Alternatively, the D2D signal is a D2D synchronization signal that is used for establishing synchronization between UEs.

As shown in FIG. 12(*a*), the MBMS control method according to the fifth embodiment comprises the steps of: receiving, by an RRC connection UE 100-2, an MBMS counting response that is transmitted by using a D2D signal; and transferring, by the RRC connection UE 100-2, to a network (an eNB 200), the received MBMS counting response. In the step of transferring, the RRC connection UE 100-2, transfers the received MBMS counting response, to the network, together with an identifier of the MBMS-compliant UE 100-1.

In this way, in the fifth embodiment, the RRC connection UE 100-2 relays the MBMS counting response (Counting information) to the network. Thus, the MBMS-compliant UE 100-1 can convey the MBMS counting response to the network while maintaining the RRC idle state.

Alternatively, as shown in FIG. 12(*b*), the MBMS control method according to the fifth embodiment comprises a step of (directly) receiving, by the network (the eNB 200), the MBMS counting response that is transmitted by using a D2D signal.

In this way, the network may directly receive the D2D signal (the MBMS counting response) rather than the RRC connection UE 100-2 relaying the D2D signal (the MBMS counting response) to the network. Thus, the MBMS-compliant UE 100-1 can convey the MBMS counting response to the network while maintaining the RRC idle state.

Figure 13:
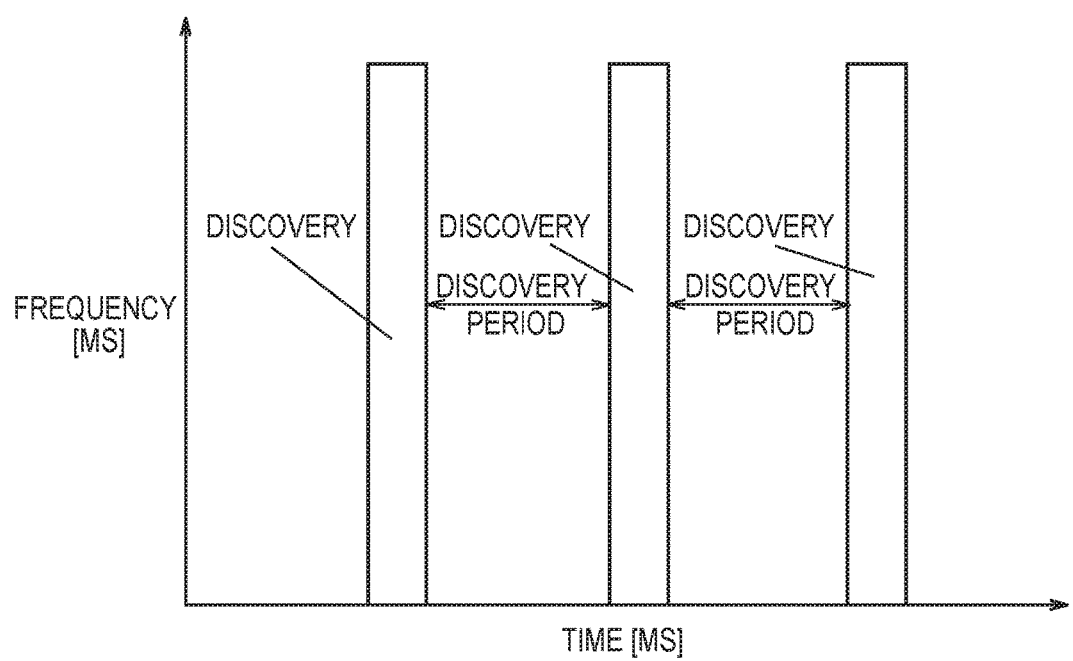
FIG. 13 is a diagram showing a method of transmitting a Discovery signal according to the fifth embodiment.

A case in which the D2D signal is a Discovery signal will be illustrated below. FIG. 13 is a diagram showing a method of transmitting a Discovery signal. As shown in FIG. 13, the Discovery signal is transmitted periodically by using a fixed frequency resource. The MBMS-compliant UE 100-1 that receives an MBMS counting request transmits an MBMS counting response (Counting information) by including in a Discovery signal, in an RRC idle state.

(2) Operation Sequence According to Fifth Embodiment

Hereinafter, an operation sequence according to the fifth embodiment will be described. FIG. 14 is a diagram showing an operation sequence according to the fifth embodiment. In an initial state shown in FIG. 14, the MBMS-compliant UE 100-1 is in an RRC idle state (Idle mode).

As shown in FIG. 14, in step S501, the MCE 330 transmits, to the eNB 200, a request for MBMS counting (enhanced Counting Request). Similar to the first embodiment, the request for MBMS counting includes a Counting Request List, a message effective period, and a message ID.

In step S502, the eNB 200 transmits the MBMS counting request (enhanced Counting Request Message) through an SIB in response to a request from the MCE 330. The MBMS counting request includes the Counting Request List, the message effective period, and the message ID. In the fifth embodiment, the MBMS counting request may include information for specifying a frequency (for example, each time, or once in X no. of times) of including the MBMS counting response (Counting information) in the Discovery signal.

The MBMS-compliant UE 100-1 that receives the MBMS counting request starts a timer for timing the message effective period. Further, the eNB 200 that has transmitted the MBMS counting request may start a timer for timing the message effective period.

In step S503, the MBMS-compliant UE 100-1 transmits an MBMS counting response (Counting information) by including in a Discovery signal. The RRC connection UE 100-2 and/or the eNB 200 receive(s) the Discovery signal. A configuration example of the Discovery signal will be described later.

In step S504, the RRC connection UE 100-2 that receives the Discovery signal including the MBMS counting response (Counting information), retains the received MBMS counting response until the expiry of the message effective period, and aggregates the MBMS counting responses.

In step S505, the eNB 200 that receives the Discovery signal including the MBMS counting response (Counting information), retains the received MBMS counting response until the expiry of the message effective period, and aggregates the MBMS counting responses.

In step S506, the RRC connection UE 100-2 transmits, to the eNB 200, the MBMS counting response after aggregation.

In step S507, the eNB 200 performs the process for resolving overlapping of the MBMS counting response. Details of the process will be described later.

In step S508, the eNB 200 transmits the MBMS counting report (enhanced Counting Report) to the MCE 330. The MBMS counting report includes a Counting Response List.

FIGS. 15(a) to 15(c) are diagrams showing a configuration example of the Discovery signal.

As shown in FIG. 15(a), in addition to the information (such as a transmission-source UE identifier, etc.) included in the normal Discovery signal, the Discovery signal includes an MBSFN area Index, a message ID, and a Counting Response List.

Alternatively, as shown in FIG. 15(b), the information about whether or not (0/1) there is an interest in only a specific MBMS service may be used in place of the Counting Response List shown in FIG. 15(a). In this case, it is necessary to specify the specific MBMS service in the MBMS counting request.

Alternatively, as shown in FIG. 15(c), the information indicating the MBMS service in which there is the most interest/the least interest from among the MBMS services included in the Counting Request List may be used in place of the Counting Response List shown in FIG. 15(a).

It is noted that cases in which the Discovery signal is used for a purpose other than the D2D communication and the MBMS counting procedure may also be considered, and information indicating that the Discovery signal is used for the purpose of the MBMS counting procedure may be included in the Discovery signal. Purposes other than the D2D communication and the MBMS counting procedure include, for example, an MBMS Interest Indication Procedure for guaranteeing MBMS reception continuity (for example, see Non Patent Literature 1), or an MBMS MDT procedure for collecting measurements of the MBMS reception status.

Further, the RRC connection UE 100-2 that receives the Discovery signal including the MBMS counting response (Counting information) may transmit a response signal corresponding to the Discovery signal. When the MBMS-compliant UE 100 cannot receive a response signal within a predetermined time from the time of transmitting the Discovery signal including the MBMS counting response (Counting information), the MBMS-compliant UE 100 may transition to the RRC connected state, and transmit an MBMS counting response (Counting information) to the network.

FIG. 16 is a diagram for describing an operation of the RRC connection UE 100-2 or the eNB 200 that receives the Discovery signal including the MBMS counting response (Counting information).

As shown in FIG. 16, to ensure that there is no overlapping, the RRC connection UE 100-2 or the eNB 200 that receives the Discovery signal including the MBMS counting response (Counting information) is stored with associating the transmission-source UE identifier of the Discovery signal and the Counting information. The message ID and the MBSFN area Index may be further associated.

FIGS. 17(a) and 17(b) are diagrams for describing a process for resolving an overlapping of an MBMS counting response.

As shown in FIG. 17(a), the eNB 200 checks matching or mismatching of the transmission-source UE identifier with regard to the MBMS counting response (Counting information) from the RRC connection UE 100-2, and the MBMS counting response (Counting information) retained in the eNB 200 itself.

As shown in FIG. 17(b), if the transmission-source UE identifier is matching, then the overlapping MBMS counting response (Counting information) is integrated into one. As a result, the overlapping of the MBMS counting response is resolved.

Other Embodiments

The aforementioned first embodiment to the fifth embodiment may be performed separately and independently and may also be performed by combining at least two embodiments.

In each of the above-described embodiments, an MBMS-compliant terminal performs a predetermined operation for transmitting an MBMS counting response on the basis of an MBMS counting request; however, this is not limiting. For example, if a base station can notify that the MBMS is terminated before the termination of a predetermined MBMS, then an MBMS-compliant terminal that is in an idle state may perform a predetermined operation for transmitting the MBMS counting response on the basis of the reception of the MBMS termination notification. In that case, the MBMS-compliant terminal that is in the idle state does not perform the predetermined operation even if receiving the MBMS counting request.

Furthermore, in each of the above-described embodiments, the LTE system is described as an example of a mobile communication system; however, the present invention may be applied not only to the LTE system but also to a system other than the LTE system.

It is noted that the entire content of Japanese Patent Application No. 2014-032295 (filed on Feb. 21, 2014) is incorporated in the present specification by reference.

INDUSTRIAL APPLICABILITY

As stated above, the MBMS control method, the user terminal, and the base station according to the present embodiment are useful in the field of mobile communication because it is possible to sufficiently understand a demand status for an MBMS service in a network.

The invention claimed is:

1. A Multimedia Broadcast/Multicast Service (MBMS) control method for determining a demand status for an MBMS service that is provided from a network of a mobile communication system, by multicast or broadcast, in the network, comprising the steps of:

transmitting, by a base station included in the network, an MBMS counting request for counting user terminals that either receive or have an interest in receiving the MBMS service, by using a predetermined signal that can be received by a user terminal in an RRC idle state;

receiving, by a first user terminal that supports MBMS reception, the MBMS counting request transmitted by using the predetermined signal, when the first user terminal is in the RRC idle state;

transmitting, by the first user terminal in the RRC idle state, an MBMS counting response to the MBMS counting request, through direct communication with a second user terminal, to the second user terminal;

receiving, by the second user terminal in an RRC connected state, the MBMS counting response through the direct communication; and transferring, by the second user terminal in the RRC connected state, to the network, the received MBMS counting response.

2. The MBMS control method according to claim 1, wherein the predetermined signal is a broadcast signal or a multicast signal.

3. The MBMS control method according to claim 2, further comprising a step of requesting, by an MBMS control apparatus included in the network, to the base station, the transmission of the MBMS counting request, wherein in the step of transmitting the MBMS counting request, the base station transmits the MBMS counting request in response to the request from the MBMS control apparatus.

4. The MBMS control method according to claim 1, wherein in the step of transferring, the second terminal transfers the received MBMS counting response, to the network, together with an identifier of the first terminal.

5. The MBMS control method according to claim 1, further comprising:

a step of receiving, by the network, the MBMS counting response that is transmitted through the direct communication.

6. A first user terminal that supports Multimedia Broadcast/Multicast Service (MBMS) reception, comprising:

a receiver configured to receive, when the first user terminal is in an RRC idle state, from a base station included in a network that provides an MBMS service either by multicast or broadcast, an MBMS counting request for counting user terminals that either receive or have an interest in receiving the MBMS service; and a transmitter configured to transmit, when the first user terminal is in an RRC idle state, an MBMS counting response to the MBMS counting request, through direct communication with a second user terminal, to the second user terminal, wherein the MBMS counting request is transmitted by a predetermined signal that can be received by a user terminal in the RRC idle state, and the MBMS counting response is transferred from the second user terminal to the network when the second terminal is in an RRC connected state.

* * * * *